United States Patent [19]
Sherwood et al.

[11] 3,747,443
[45] July 24, 1973

[54] QUICK ACTING CARRIAGE SHIFTING MECHANISM FOR A LATHE

[75] Inventors: Charles D. Sherwood, Elmira; James R. Cordier, Erin, both of N.Y.

[73] Assignee: Hardinge Brothers, Inc., Elmira, N.Y.

[22] Filed: June 24, 1971

[21] Appl. No.: 156,247

[52] U.S. Cl. ................................. 82/24 R
[51] Int. Cl. .................................. B23b 21/00
[58] Field of Search ..................... 82/12, 21, 24

[56] References Cited
UNITED STATES PATENTS

| | | | |
|---|---|---|---|
| 921,985 | 5/1909 | Hanson | 82/24 |
| 945,453 | 1/1910 | Hanson | 82/24 |
| 945,456 | 1/1910 | Hanson | 82/24 |
| 940,928 | 11/1909 | Hanson | 82/24 |
| 2,131,129 | 9/1938 | Whitehead | 82/24 |

*Primary Examiner*—Harrison L. Hinson
*Attorney*—Shlesinger, Arkwright & Garvey

[57] ABSTRACT

A quick acting carriage shifting mechanism for a lathe comprising a pair of rotary operators having their axes of rotation at substantially right angles to each other, a feed screw shaft for connection with the carriage for moving the carriage back and forth, the feed screw shaft being both rotatable and translatable about a longitudinal axis, one of the operators being mounted on the shaft for only rotating the shaft for slow, incremental movement of the carriage, and the other operator being mounted for only translatory shifting of the shaft for fast movement of the carriage.

11 Claims, 5 Drawing Figures

PATENTED JUL 24 1973

INVENTORS
Charles D. Sherwood
James R. Cordier

Shlesinger, Arkwright & Garvey

ATTORNEYS

QUICK ACTING CARRIAGE SHIFTING MECHANISM FOR A LATHE

This invention relates to a tool carriage shifting mechanism for a lathe, and more particularly to a carriage shifting mechanism having two modes of operation wherein the carriage may be shifted slowly for feeding the tool into the work piece, or rapidly for withdrawing the tool from the work piece to permit insertion of a new work piece.

Prior art lathes have generally had but a single means for advancing the tool into the work piece. This advancing means generally consists of a feed screw which threadedly engages a portion of the tool carriage. The feed screw is usually prevented from reciprocating motion along its axis and is generally provided with a crank handle at the distal end of the feed screw. In this manner, by turning the handle, the feed screw is rotated, and the threads on the screw serve to reciprocate the tool carriage toward or away from the work. The speed with which the tool is advanced toward the work is generally controlled by the speed of rotation of the feed screw, coupled with the pitch of the threads on the feed screw. For most lathes, and particularly lathes where great precision is required, a rather low pitch is utilized on the feed screw to permit slow feeding of the tool into the work piece. In this manner, great precision can be obtained in the machining operation. This precision is absolutely necessary when machine optical devices such as contact lenses, eyeglass lenses and the like.

If the pitch of the feed screw were too great, the precision obtainable would be a function of the skill of the operator instead of the quality of the machine.

However, one disadvantage of slow tool feed and withdrawal is the time required to change work pieces on the tool. In order to change the work piece, the feed screw must be rotated in the reverse direction, and slowly, the tool carriage withdraws from the work piece. Generally, for contact lenses, it is necessary to withdraw the tool a distance of approximately ½ to 2 inches in order to permit changing of the work piece. This can be a rather time consuming operation when the feed screw has low pitched threads.

Therefore, a primary object of this invention is to overcome the disadvantages of prior art lathes.

Another object of this invention is to provide a quick acting carriage shifting mechanism for a lathe.

A further object of this invention is to provide a lathe carriage shifting mechanism capable of operation in both fast and slow modes.

Still another object of this invention is to provide a carriage shifting mechanism of simple yet reliable and precise construction.

Still a further object of this invention is to provide a carriage shifting mechanism having two integrated operators, one for fast feeding and withdrawal of the tool and one for slow feeding and withdrawal of the tool.

Yet another object of this invention is to provide a carriage shifting mechanism which may be attached to existing lathes with but little modification.

These and other objects and advantages of this invention will become apparent when considered in light of the following description and claims when taken together with the accompanying drawings in which:

DESCRIPTION OF THE INVENTION

Figure 1:
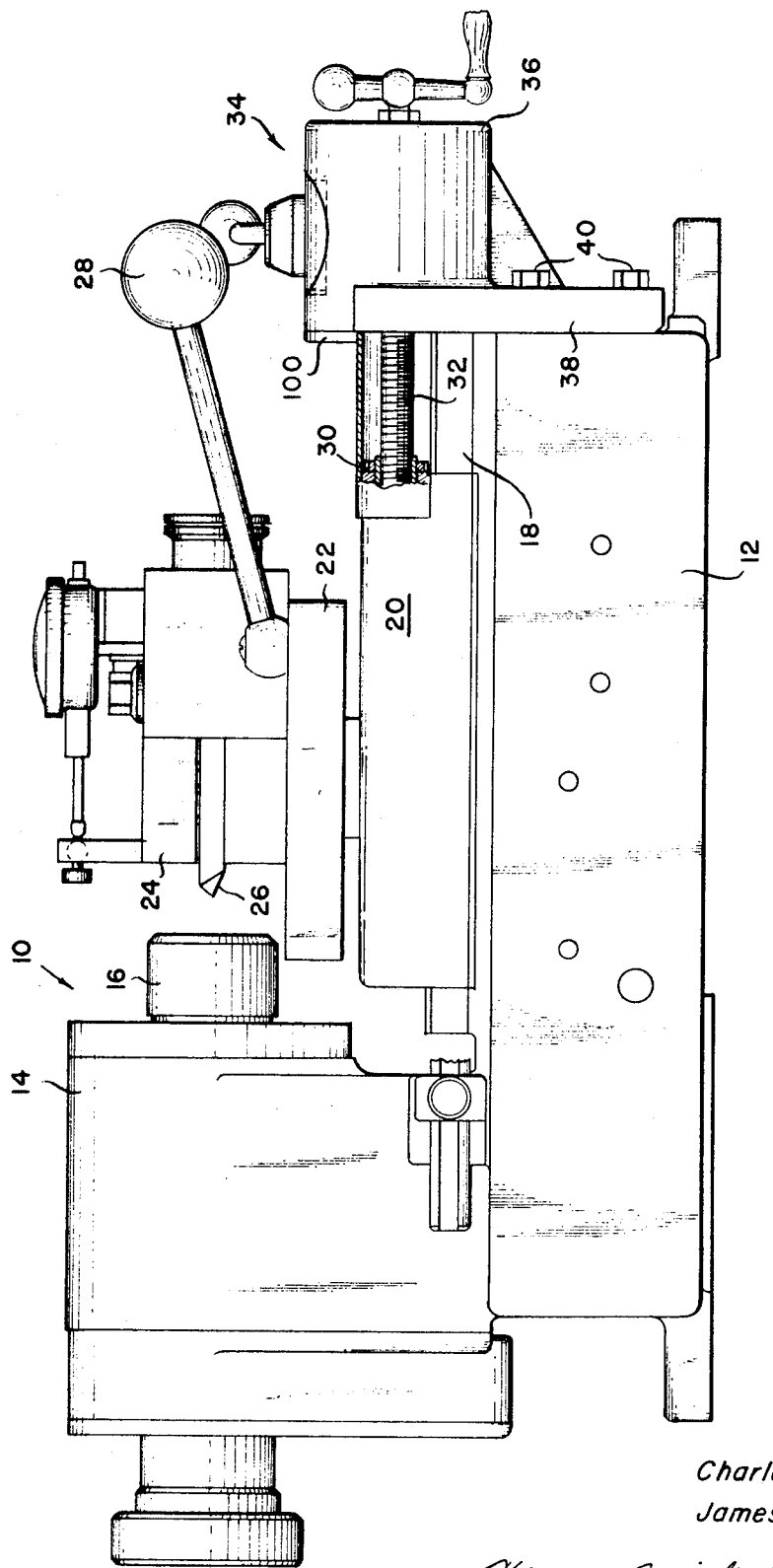
FIG. 1 is a side elevation of a lathe utilizing this invention.

Referring now to FIG. 1, a lathe generally designated 10 is shown and includes a base member 12 and a headstock 14. The headstock 14 includes a spindle 16 which would have a suitable collet or chuck (not shown).

Mounted on the base 12 of the lathe 10 is a bed or way 18 of the usual dovetail configuration. Mounted on the way 18 is the tool carriage 20. Carriage 20 is permitted to reciprocate on the way 18 in the usual manner.

The tool carriage 20 supports a swivel plate 22 which is mounted for rotation about a vertical axis. The swivel plate 22 also carries thereon a tool holder 24 for a suitable cutting tool 26. The tool holder is adjustable longitudinally on the swivel plate 22 to vary the cutting radius. A handle 28 is provided to rotate the cutting tool 26 to cut an arc on the work piece.

The means by which the tool carriage is adjusted longitudinally on the lathe bed 18 includes a feed screw nut 30 secured to the tool carriage 20. A feed screw 32 threadedly engages the feed screw nut 30 and extends into the carriage shifting mechanism generally designated 34. This carriage shifting mechanism 34 includes a housing 36 having a flange 38 which is bolted to the lathe base 12 by means of bolts 40.

Figure 2:
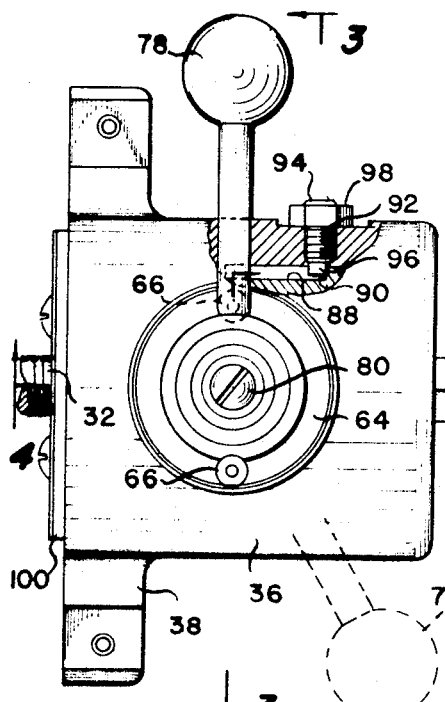
FIG. 2 is a top plan view of the carriage shifting mechanism of this invention.
Figure 3:
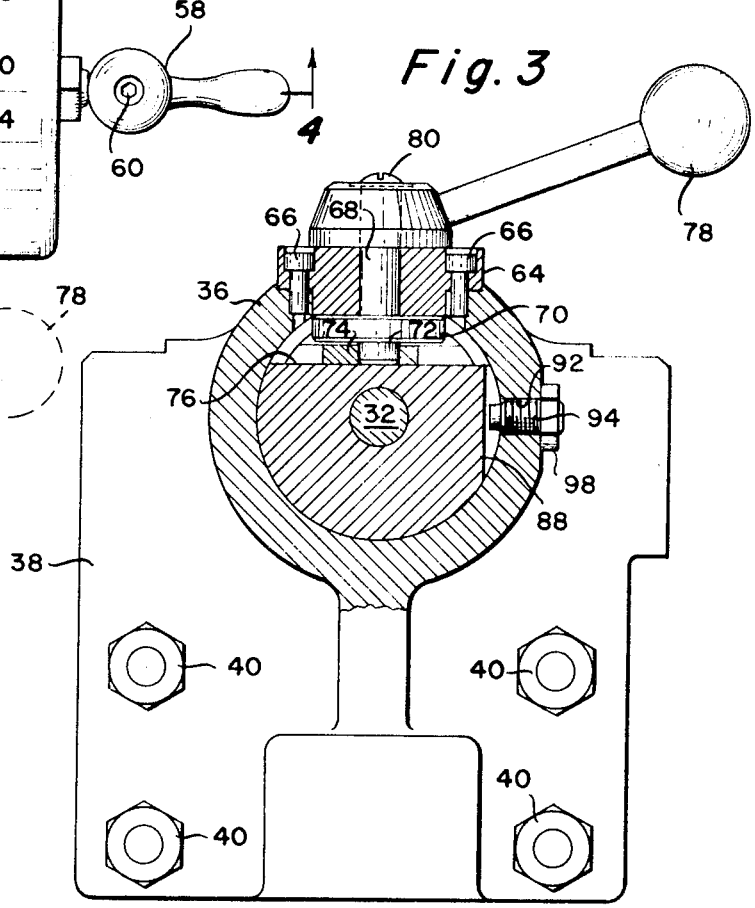
FIG. 3 is a section along lines 3—3 of FIG. 2 and viewed in the direction of the arrows.
Figure 4:
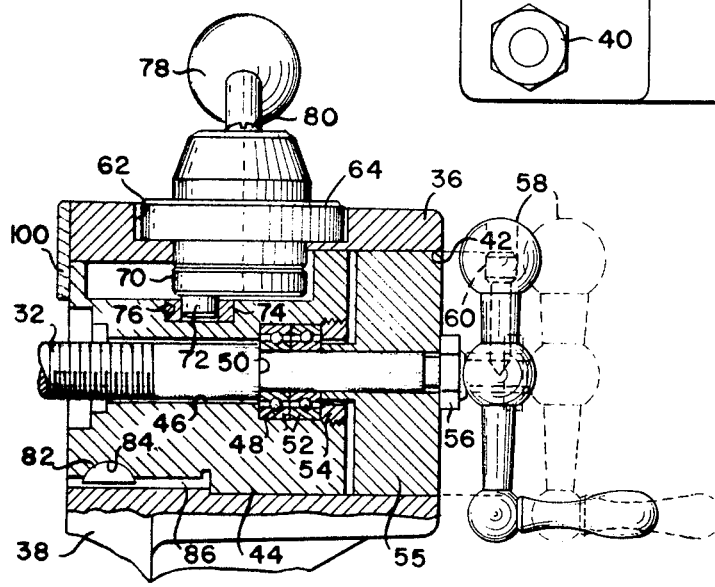
FIG. 4 is a section along lines 4—4 of FIG. 2 and viewed in the direction of the arrows.

Referring now to FIGS. 2 through 4, housing 36 is seen to have a substantially cylindrical bore 42 in which is positioned a bearing support member or drum 44. Drum 44 has a centrally positioned bore 46 through which passes the feed screw 32. The bore 46 is counterbored as at 48, and the feed screw shaft 32 is stepped down as shown at 50. Positioned within counterbore 48 and around the stepped down portion 50 of feed screw 432 are a pair of bearings 52. Bearings 52 are retained in position by means of nut 54 threaded into counterbore 48. A bushing 55 is positioned around portion 50 of feed screw 32 and is secured in position by means of a nut 56 threaded onto feed screw 32. At the outermost portion of feed screw 32 is provided a handle 58 secured to feed screw 32 by means of set screw 50.

By the mechanism thus far described, rotation of the handle 58 will result in slow reciprocation of the tool carriage 20 so as to feed the tool 26 into the work piece slowly.

The means by which the tool carriage 20 may be reciprocated rapidly will now be described. Housing 36 is shown to have a cutout portion 62 which positions a support member 64. Support member 64 is secured to the housing 36 by means of screws 66. Support member 64 serves to position a shaft 68 having an annular flange portion 70. Depending from the flange portion 70 is an eccentric projection 72. Eccentric pin 72 fits into an eccentric bearing block 74 in a slot 76 in drum 44. Secured to the upper end of shaft 68 is a handle 78 which is held in place by means of a screw 80.

To prevent relative rotation between drum 44 and housing 36, while still permitting relative reciprocation of these parts, a key 82 is positioned in slot 84 in drum 44 and slot 86 in housing 36.

Figure 5:
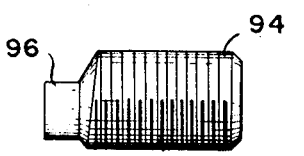
FIG. 5 is a side elevation of one of the parts of the invention.

As best seen in FIGS. 2 and 3, drum 44 has a cutout portion 88 along one side thereof so as to form a shoulder 90. Housing 36 is provided with a threaded bore 92 into which is screwed an eccentric stop screw 94 best seen in FIG. 5. Stop screw 94 is seen to have an eccentric projection 96 thereon. Stop screw 94 is threaded into bore 92 and locked in position by means of a nut 98. Stop screw 94 serves a purpose to be hereinafter more fully described.

Referring now to the full line positions shown in FIGS. 2 and 4, the handle 78 is shown to be in a position whereby the tool carriage 20 and tool 26 are either about to begin a cutting operation, or have just completed a cutting operation. In order to move the tool carriage 20 rapidly away from the work piece, handle 78 is swung through an arc of about 180°. The dotted line positions of FIGS. 2 and 4 show the position of the handle and the carriage actuating mechanism at a postion of approximately three-fourths of fully retracted. As the handle 78 is swung through the arc aforementioned, eccentric projection 72 bears against the eccentric block 74 and moves the drum 44, bushing 54, handle 58, feed screw 32 and tool carriage 20 to a retracted position as shown by dotted lines in FIG. 4. This in turn withdraws the cutting tool 26 away from the work piece to facilitate changing work pieces. Key 82 permits this reciprocation of the drum 44 within the housing 36.

After the work piece has been changed, the handle 78 is returned to the solid line position shown in FIG. 2, and shoulder 90 on drum 44 contacts the projection 96 on stop screw 94. The stop screw 94 may be rotated so as to vary the stopping position of the drum 44 and simultaneously the tool carriage 20 in the fully forward position. In this manner, the tool 26 is not fed into the work piece until the handle 58 is rotated as previously described.

A cover 100 may be provided on the left end of the housing 36 as seen in FIG. 4 in order to prevent foreign matter from entering the carriage shifting mechanism.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:
1. A lathe having in combination a quick acting carriage shifting mechanism comprising:
 a. a base member;
 b. a headstock having a spindle rotatable about an axis parallel to said base member,
 c. tool carriage means mounted on said base member for longitudinal reciprocation toward and away from said spindle and parallel to said axis,
 d. lead screw means substantially parallel to said axis and connected to said tool carriage means for moving said tool carriage means relatively slowly toward and away from said spindle upon rotation of said lead screw means,
 e. a drum member rotatably mounting said lead screw and reciprocable therewith,
 f. a transverse slot in said support member,
 g. an eccentric pin member engaging said slot,
 h. a handle member secured to said eccentric pin member,
 i. whereby actuation of said handle member operates said eccentric pin member in said slot to shift said drum member said lead screw, and said tool carriage parallel to said axis and said base member longitudinally toward or away from said spindle.
2. A lathe as in claim 1 and including:
 a. a housing attached to said base member,
 b. said housing having a substantially cylindrical bore therein for receiving said lead screw means and said drum member.
3. A lathe as in claim 2 and wherein:
 a. said shaft means further includes a substantially cylindrical drum member positioned in said bore,
 b. said feed screw shaft member being mounted in said drum member and being free to rotate with respect to said drum member and constrained from reciprocation with respect to said drum member.
4. A lathe as in claim 2 and wherein:
 a. said drum member includes bearing means for positioning said feed screw shaft member in said drum member.
5. A lathe as in claim 4 and including:
 a. means for limiting reciprocation of said drum member in said housing.
6. A lathe as in claim 5 and wherein:
 a. said limiting means is adjustable so as to permit variation in the reciprocation of said drum member.
7. A lathe as in claim 6 and wherein:
 a. said limiting means comprises a stop screw threadedly engaging said housing and having a portion projecting into said housing, and
 b. said drum member having a pair of shoulders engageable by said projecting portion at the limits of reciprocation.
8. A lathe as in claim 7 and wherein:
 a. said projecting portion is eccentric to the longitudinal axis of said stop screw.
9. A lathe as in claim 2 and including:
 a. means for preventing relative rotation of said drum member and said housing while permitting relative reciprocation of said drum member and said housing,
 b. said last mentioned means comprising a first keyway formed in said drum member,
 c. a second keyway formed in said housing in alignment with said first keyway, and
 d. a key member positioned in each of said keyways.
10. A lathe as in claim 1 and wherein:
 a. said handle member is rotatable, and
 b. said eccentric pin is parallel to the axis of rotation of said handle member.
11. A lathe as in claim 2 and including:
 a. means for supporting said eccentric pin member in said housing.

* * * * *